United States Patent [19]

Horike et al.

[11] 4,288,797

[45] Sep. 8, 1981

[54] VARIABLE-CHARGE TYPE INK-JET PRINTER

[75] Inventors: Masanori Horike, Tokyo; Koichiro Jinnai, Kawasaki; Kyuhachiro Iwasaki, Fujisawa; Yutaka Kodama, Tokyo, all of Japan

[73] Assignee: Ricoh Co., Ltd., Tokyo, Japan

[21] Appl. No.: 81,338

[22] Filed: Oct. 3, 1979

[30] Foreign Application Priority Data

Nov. 10, 1978 [JP] Japan ............................... 53-124122

[51] Int. Cl.$^3$ ............................................. G01D 15/18

[52] U.S. Cl. ....................................................... 346/75

[58] Field of Search .......................................... 346/75

[56] References Cited

U.S. PATENT DOCUMENTS 3,739,395 6/1973 King ...................................... 346/75

3,786,517 1/1974 Krause .................................. 346/75

3,895,386 7/1975 Keur .................................. 346/75 X 4,086,602 4/1978 Yamada ................................ 346/75

*Primary Examiner*—Joseph W. Hartary

*Attorney, Agent, or Firm*—Burgess, Ryan and Wayne

[57] ABSTRACT

An ink-jet printer wherein a pair of horizontal deflection electrodes and a pair of vertical deflection electrodes are disposed in the order named in the direction of travel of ink drops so that the charged ink drops may be deflected in the horizontal direction depending upon the charge on the respective ink drops, but the vertical deflection electrodes are so arranged or shaped or applied with such deflection voltage that the charged ink drops may be deflected in the vertical direction by the same amount, regardless of the charge on the respective ink drops, away from the trajectory of the uncharged ink drops, whereby the ink dots may be aligned along a horizontal line.

9 Claims, 15 Drawing Figures

VARIABLE-CHARGE TYPE INK-JET PRINTER

BACKGROUND OF THE INVENTION

The present invention relates to an electrostatic or variable-charge type ink-jet printer wherein a plurality of print head units are arranged in a horizontal array so that they may print an entire line at one time at high speed, leaving high quality printed images and wherein the deflection electrodes are so arranged that they may be shared in common by as many print head units as possible, whereby the multiple-nozzle print head may be remarkably simplified in construction.

With the conventional electrostatic type ink-jet printers, the charged ink drops are not deflected in the vertical direction. As a result, a gutter, which traps the uncharged or unused ink drops, must be disposed in the horizontal plane which includes the axis of the nozzle and the trajectories as well of the ink drops to be placed on a recording medium. Therefore it is impossible to place the ink drops at the positions in the shadow of the gutter. As a consequence, the conventional electrostatic ink drop steering systems are not adapted for use in the ink-jet in-line printers.

There have been therefore devised and demonstrated various types of multi-nozzle ink-jet printers wherein the charged ink drops are also deflected in the vertical direction in order to jump over the gutter so as to be placed at the positions in the shadow of the gutter, but they have a common defect that the vertical deflections of the charged ink drops vary from one print head unit to another and cannot be adjusted with a high degree of accuracy.

SUMMARY OF THE INVENTION

In view of the above, the primary object of the present invention is to provide a variable charge type ink-jet printer wherein a pair of horizontal deflection electrodes and a pair of vertical deflection electrodes are disposed in the order named in the direction of travel of ink drops, and the horizontal deflection electrodes are supplied with a predetermined deflection voltage so that the charged ink drops may be deflected in the horizontal direction depending upon the charge on the ink drops while the vertical deflection electrodes are so arranged or shaped or supplied with such deflection voltage that the charged ink drops may be deflected in the vertical direction by the same amount, regardless of the charge on the respective ink drops, away from the trajectory of the uncharged ink drops which are to be trapped by a gutter.

Another object of the present invention is to provide a variable-charge type ink-jet printer wherein a plurality of print head units or nozzles may share in common as many deflection electrodes as possible so that the print head may be remarkably simplified in construction and the multiple-nozzle arrangement may be much facilitated.

BRIEF DESCRIPTION OF THE DRAWINGS

Same reference numerals are used to designate similar parts throughout the figures.

DESCRIPTION OF THE PREFERRED EMBODIMENTS

Figure 1:
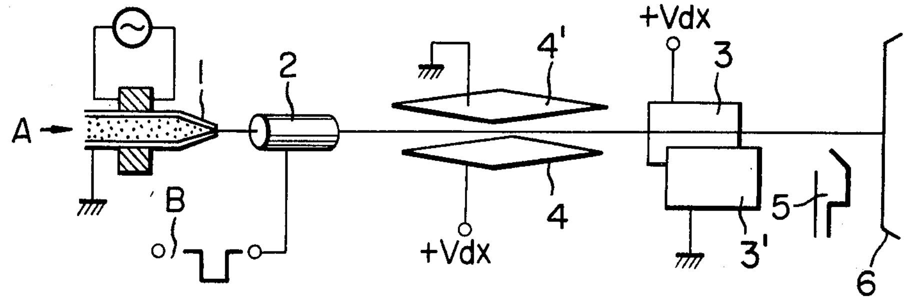
FIG. 1 is a schematic view used for the explanation of the underlying principle of the present invention.
Figure 2:
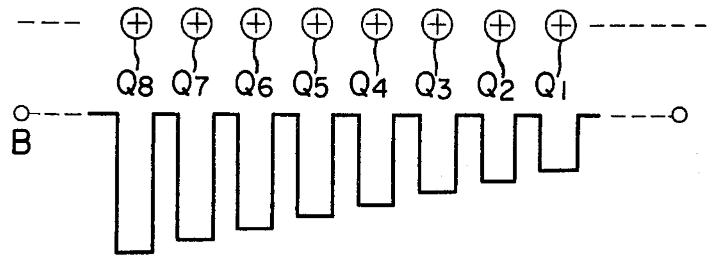
FIG. 2 shows a train of eight ink drops which are charged stepwise by a stepping charge pulse train.

Referring first to FIGS. 1 and 2, the underlying principle of the present invention will be described. As shown in FIG. 1, a print head unit comprises a nozzle 1, a charge electrode 2, a pair of vertical deflection electrodes 3 and 3', a pair of horizontal deflection electrodes 4 and 4' and a gutter 5 in front of recording paper 6. Ink A under pressure is supplied to the nozzle 1, and charge pulses B are applied to the charge electrode 2.

Assuming that ink drops are free from either aerodynamic and electrostatic disturbances while they are in flight, the deflection $x_d$ of an ink drop is given by $$x_d = \frac{Qj}{mj} \cdot \frac{V_d}{S_d} \cdot \frac{1}{V_j^2} \cdot l_d\left(Z_p - \frac{l_d}{2}\right) \quad (1)$$

where mj = the mass of an ink drop, qj = the charge on an ink drop, $V_d$ = a voltage applied across the deflection electrodes, $S_d$ = spacing between the deflection electrodes, $V_j$ = the velocity of an ink drop, $l_d$ = the length of deflection electrodes, and $Z_p$ = the distance from the entrance to the deflection electrodes to recording paper.

As shown in FIG. 2, for example, eight stepped charge pulses B which are equally spaced apart from each other are applied to the charge electrode 2 to charge eight ink drops $Q_1$ through $Q_8$, respectively. Since the charge pulses B are negative, the ink drops $Q_n$ are positively charged.

In the print head unit in accordance with the present invention, the gutter 5 is disposed below the ink dot printing line so that it may become possible to place the ink drops at any positions on the recording sheet 6 behind the gutter 5 while the prior art variable-charge ink-jet printers cannot do so. As a result the whole ink dot line may be printed across the sheet 6.

Figure 3:
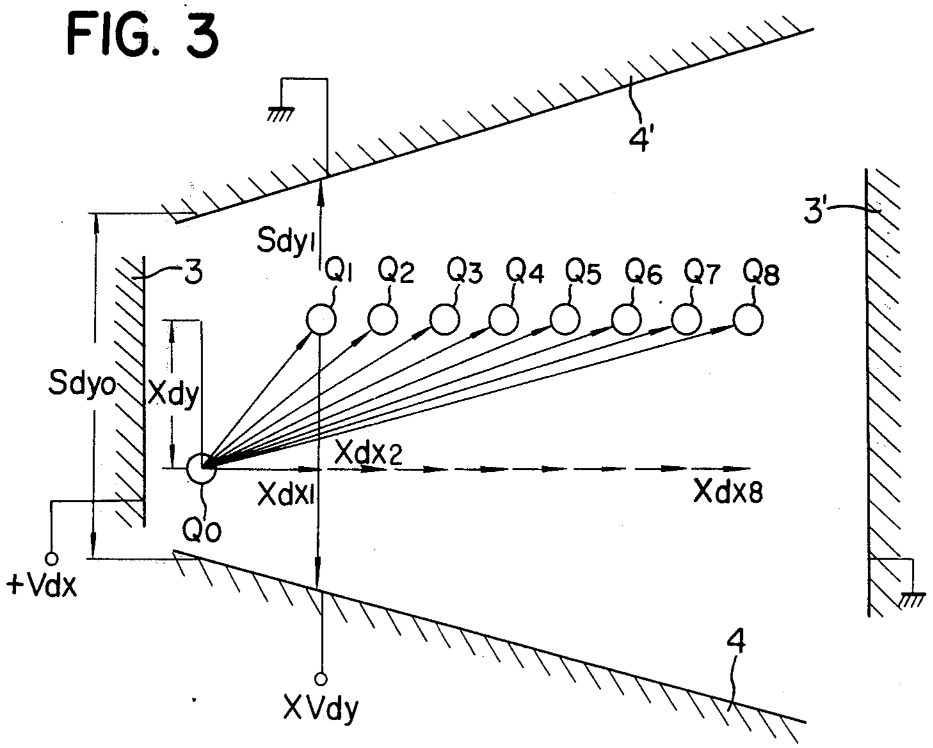
FIG. 3 shows a deflection electrode system in accordance with the present invention in which a pair of vertical deflection electrodes are so arranged that spacing between them increases with distance in the direction of the deflection in the horizontal direction of the charged ink drops.

As shown in FIG. 3, the X deflection electrodes 3 and 3' may be disposed in parallel with each other while the Y deflection electrodes 4 and 4' may be so arranged that spacing between them increases with distance in the direction of deflection of ink drops by X electrodes. As a result, each ink drop experiences different forces depending on its horizontal positions so that the charged ink drops $Q_1$ through $Q_8$ may be deflected in the vertical direction by a predetermined distance $x_{dy}$. An uncharged ink drop $Q_0$ is not affected by the electric fields so that it travels toward and is intercepted by the gutter 5.

The deflections $x_d$ of charged ink drops may be obtained from Eq. (1) depending upon the charge on each ink drop. Therefore, the ink drops are deflected in the horizontal direction by $x_{dx1}-x_{dx8}$, respectively, depending upon the charge $Q_1$ through $Q_8$ on them.

Figure 4:
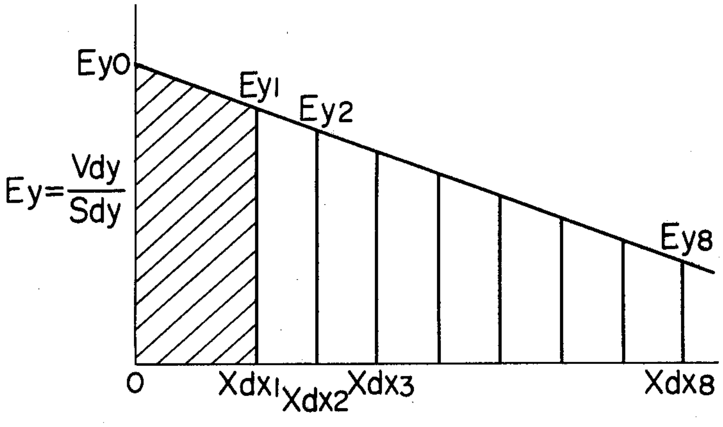
FIG. 4 shows the relationship between the horizontal deflections of the charged ink drops and the field strength they experience when passing between the horizontal deflection electrodes shown in FIG. 3.

When each ink drop, which is charged, passes between the Y deflection electrodes, the field strength which the ink drop experiences varies depending upon the horizontal deflection of the ink drop imparted by the X deflection electrodes as shown in FIG. 4. The ink drop with the charge $Q_1$ experiences the variation in field strength from $E_{y0}$ to $E_{y1}$. The ink drop with the charge $Q_2$, from $E_{y0}$ to $E_{y2}$, and so on. The ink drop with the charge $Q_8$, from $E_{y0}$ to $E_{y8}$. The average variation in field strength which the ink drop $Q_1$ experiences may be given by $$\frac{V_{dy}}{\frac{S_{dy0}+S_{dy1}}{2}}$$

where $S_{dy0}$ = spacing between the Y deflection electrodes at the entrance to them (that is, the spacing at $Q_0$ in FIG. 3), and $S_{dy1}$ = spacing between Y deflection electrodes at $Q_1$.

Therefore from Eq. (1) the vertical deflection of the ink drop $Q_1$ is $$x_{dy1}=\frac{Q_1}{mj}\cdot\frac{V_{dy}}{\frac{S_{dy0}+S_{dy1}}{2}}\cdot\frac{1}{V_j^2}\,l_d\left(Z_p-\frac{l_d}{2}\right)$$

In like manner, the average field strength which the ink drop $Q_2$ experiences may be approximated to $$\frac{V_{dy}}{\frac{S_{dy0}+S_{dy2}}{2}}$$

Inserting this in Eq. (1), the vertical deflection $x_{dy2}$ for the ink drop $Q_2$ is obtained. In like manner, the vertical deflections $x_{dy3}$ through $x_{dy8}$ for the ink drops $Q_3$ through $Q_8$ may be obtained. Since $Q_1<Q_2<Q_3<\ldots<Q_8$ and $S_{dy1}<S_{dy2}<S_{dy3}<\ldots<S_{dy8}$, spacing $S_{dy}$ between the Y deflection electrodes may be so determined that the following condition may be satisfied:

$$x_{dy}=x_{dy1}=x_{dy2}=\ldots=x_{dy8}$$

Then all the charged ink drops $Q_1$ through $Q_8$ may be deflected vertically by the same distance.

FIRST EMBODIMENT, FIG. 5

Figure 5:
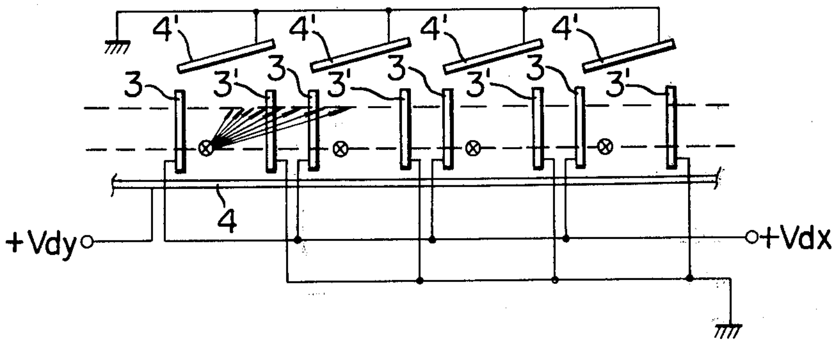
FIGS. 5 and 6 are schematic views, respectively, of first and second embodiment of a multiple-nozzle ink-jet print head in accordance with the present invention wherein one of the vertical deflection electrodes is tilted relative to the other.

In FIG. 5 is shown a multi-nozzle print head wherein the print head units of the type described above are arranged into a horizontal array. A pair of X deflection electrodes 3 and 3' is provided for each print head unit, one of the Y deflection electrodes to which is applied a high deflection voltage $V_{dy}$ is common to all print head units while the other electrodes 4', which are shown as being grounded, are provided for respective print head units and tilted at an angle as shown so that the charged ink drops may be deflected in the vertical direction by the same distance as described elsewhere with reference to FIGS. 3 and 4. The deflections in the horizontal direction of the charged ink drops are different depending upon the charge on each ink drop. Thus the whole ink dot line may be printed across the sheet 6.

The inclination of the grounded electrodes 4' may be individually adjusted so that the variations in vertical deflection from one unit to another may be eliminated. Alternatively, each print head unit may be provided with an individual electrode 4 instead of the common electrode so that the deflection voltage $V_{dy}$ applied to each electrode 4 may be fine adjusted so as to eliminate the variations in vertical deflection from one unit to another. Thus all the ink drops may be aligned in the horizontal direction with a higher degree of accuracy so that high quality print images may be ensured.

SECOND EMBODIMENT, FIG. 6

Figure 6:
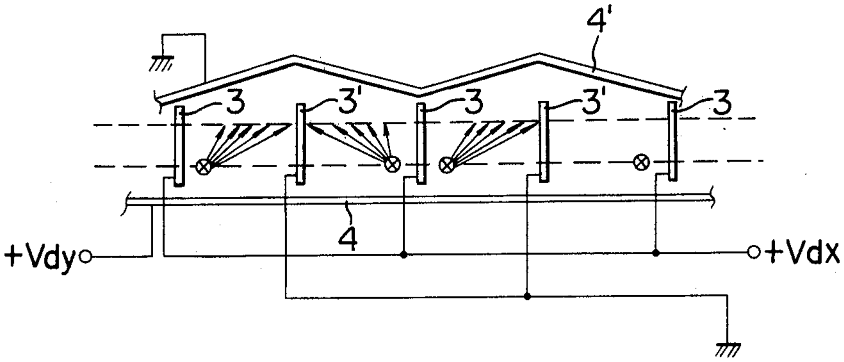

In FIG. 6 is shown a second embodiment of the present invention wherein one of the X electrodes 3' is shared in common by the adjacent print head units. Therefore the adjacent electrodes 4', which are grounded, are so arranged as to be symmetrical about the common X electrode 3'. With this arrangement, however, the problem arises that the positions on the sheet 6 in the shadow of the electrode 3 to which is applied a high deflection voltage $V_{dx}$ cannot be printed with ink drops. This problem may be solved by inclining the nozzle in the horizontal direction by a suitable angle.

In either of the first and second embodiments shown in FIGS. 5 and 6, respectively, it is preferable to space the X and Y deflection electrodes from each other in the direction of travel of ink drops as shown in FIG. 1 so that the electrostatic disturbances may be eliminated or minimized.

THIRD AND FOURTH EMBODIMENTS, FIGS. 7 THROUGH 10

Figure 7:
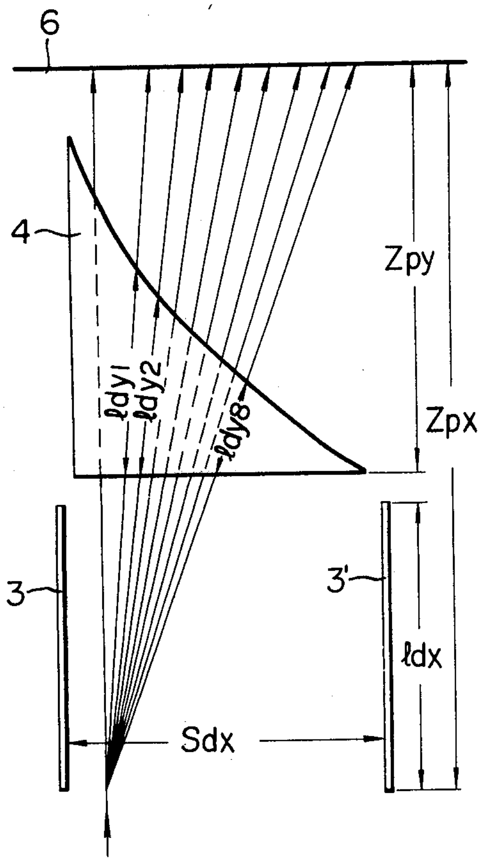
FIGS. 7 and 8 are top views of third and fourth embodiments, respectively, of the present invention.
Figure 8:
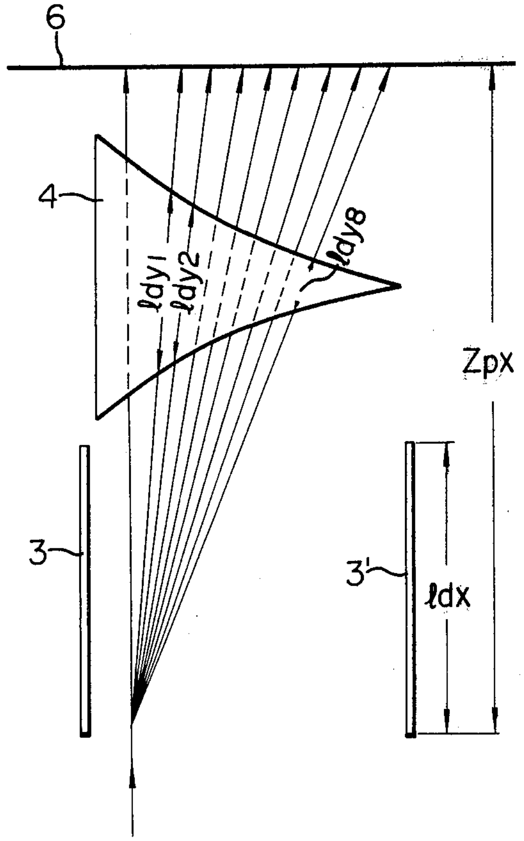
Figure 9:
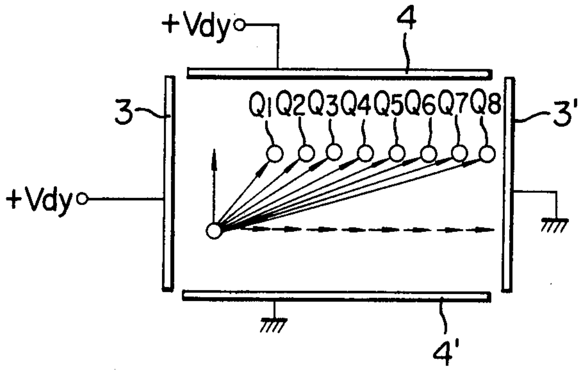
FIG. 9 shows the horizontal and vertical deflections of the charged ink drops in the third and fourth embodiments shown in FIGS. 7 and 8.
Figure 10:
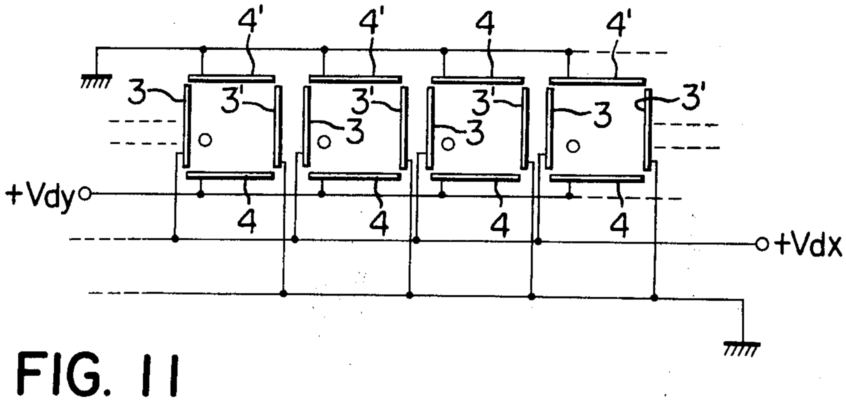
FIG. 10 shows a multiple-nozzle print head comprising a horizontal array of print head units of the type shown in FIG. 7 or 8.

FIGS. 7 and 8 are top views, respectively, of third and fourth embodiments of the present invention; FIG. 9 is a view showing the trajectories of the charged ink drops; and FIG. 10 shows their multi-nozzle ink-jet print head construction.

In the third embodiment shown in FIG. 7, the Y deflection electrodes 4 and 4' are so curved as to satisfy the following conditions:

$$\left(Z_{py}-\frac{l_{dy1}}{2}\right)=\frac{x_{dy}}{KQ_1}$$

-continued $$\left(Z_{py}-\frac{l_{dy2}}{2}\right)=\frac{x_{dy}}{KQ_2}$$

.
.
.

$$\left(Z_{py}-\frac{l_{dy8}}{2}\right)=\frac{x_{dy}}{KQ_8}$$

where $l_{dy1}$ through $l_{dy8}$ = the distances which the ink drops with the charge $Q_1$ through $Q_8$, respectively, travel between the Y deflection electrodes 4 and 4', and K = a constant obtained from Eq. (1) when mj, $V_{dy}$, $S_{dy}$ and $V_j^2$ are constant.

When the Y deflection electrodes 4 and 4' are curved as described above, all the charged ink drops $Q_1$ through $Q_8$ may be deflected in the vertical direction by the same amount while the uncharged ink drop $Q_0$ will not be deflected at all and consequently travels toward and is intercepted by the gutter 5 which is disposed below the ink dot printing line.

In the fourth embodiment shown in FIG. 8, the shape of the Y electrodes 4 and 4' is also determined in the manner described above. The shape shown in FIG. 8 is advantageous in that the charged ink drops $Q_1$ through $Q_8$ may more accurately travel the respective, predetermined distances $l_{dy1}$ through $l_{dy8}$ between the Y deflection electrodes 4 and 4'.

In the embodiments so far described with reference to FIGS. 1 through 10, the Y deflection electrodes are so arranged that spacing between them increases with distance in the direction of the deflection of charged ink drops by the X deflection electrodes so that the ink drops may be deflected in the vertical direction by the same amount regardless of the charge imparted to respective ink drops, but the same effects may be attained when a sawtooth deflection voltage is applied across a pair of Y deflection electrodes which are disposed in parallel with each other as will be described in detail below.

FIFTH EMBODIMENT, FIGS. 11 THROUGH 13

Figure 11:
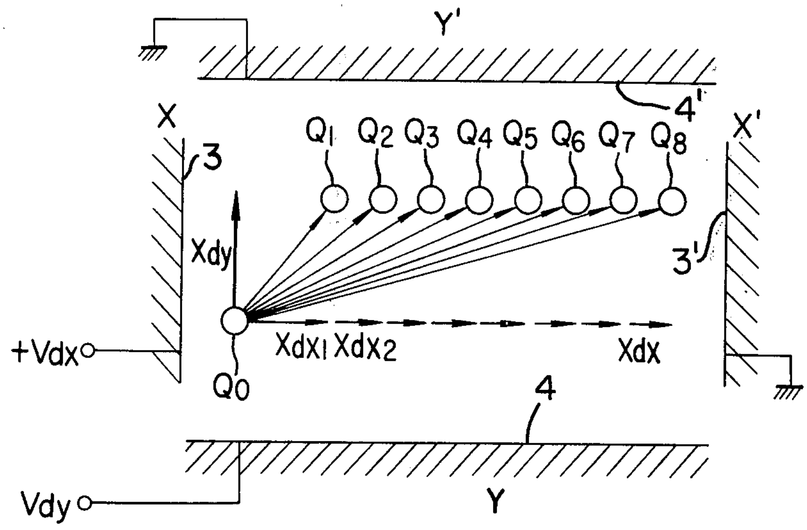
FIGS. 11 and 12 are views used for the explanation of another underlying principle of the present invention.
Figure 12:
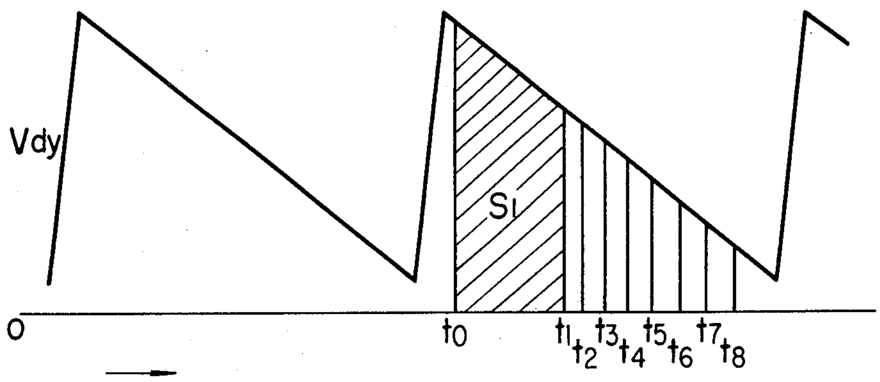

Referring first to FIG. 11, a predetermined deflection voltage $+V_{dx}$ is applied across a pair of X deflection electrodes X and X' which are disposed in parallel with each other while a sawtooth deflection voltage $V_{dy}$ as shown in FIG. 12 is applied across a pair of Y deflection electrodes Y and Y', which are also disposed in parallel with each other and orthogonal to the X deflection electrodes X and X', whereby the charged ink drops may be deflected in the vertical direction by the same amount. But an uncharged ink drop $Q_0$ is not deflected vertically so that it travels toward and is intercepted by the gutter 5.

FIG. 12 shows the sawtooth deflection voltage $V_{dy}$ applied across the Y deflection electrodes. The rising and falling intervals are in exact synchronism with the flying time intervals of the charged ink drops $Q_1$ through $Q_8$ between the Y deflection electrodes. The flying time intervals are

| | |
|---|---|
| $t_0$ to $t_1$ | for the ink drop $Q_1$ |
| $t_0+\Delta t$ to $t_2$ | for the ink drop $Q_2$ |
| $t_0+2\Delta t$ $t_3$ | for the ink drop $Q_3$ |
| . | |
| . | |
| $t_0+7\Delta t$ $t_8$ | for the ink drop $Q_8$ |

where $\Delta t$ = a time spacing between the adjacent ink drops. The time intervals between $t_1$ and $t_2$, between $t_2$ and $t_3$, . . . and between $t_7$ and $t_8$ increase gradually because of the accumulation of time spacing between the ink drops, and the flying time intervals increase as the charge on the ink drops increases because if the velocity is same, the higher the charge imparted to an ink drop, the more the ink drop is deflected in the horizontal direction so that its flying parth or trajectory between the Y deflection electrodes becomes longer. Therefore the ink drop with the charge $Q_1$ is deflected in the vertical direction by the amount which is proportional to the hatched area $S_1$ in FIG. 12. In like manner, the ink drops $Q_2$ through $Q_8$ are deflected.

The vertical deflection voltage $V_{dy1}$ applied to the Y deflection electrodes from $t_0$ to $t_1$ during which the ink drop $Q_1$ flies between the electrodes is given by $$\frac{S_1}{t_1-t_0}=V_{dy1}$$

Substituting this in Eq. (1), the vertical deflection $x_{dy1}$ is obtained as follows:

$$x_{dy1}=\frac{Q_1}{mj}\cdot\frac{V_{dy1}}{S_d}\cdot\frac{1}{V_j^2}\,l_d\left(Z_p-\frac{l_d}{2}\right)$$

In like manner, $x_{dy2}$ through $x_{dy8}$ may be obtained. As the charge on the ink drops increases from $Q_1$ to $Q_8$, the vertical deflection voltage decreases from $V_{dy1}$ to $V_{dy8}$. And, as described above, the vertical deflection voltage $V_{dy}$ may be so linearly varied in synchronism with the flying time intervals of charged ink drops so that the following condition may be satisfied:

$$x_{dy}=x_{dy1}=x_{dy2}=\ldots=x_{dy8}$$

That is, all the charged ink drops $Q_1$ through $Q_8$ may be deflected in the vertical direction by the same amount regardless of the charge imparted to the ink drops.

The deflections in the X or horizontal direction vary depending upon the charge $Q_1$ through $Q_8$ on the ink drops.

Figure 13:
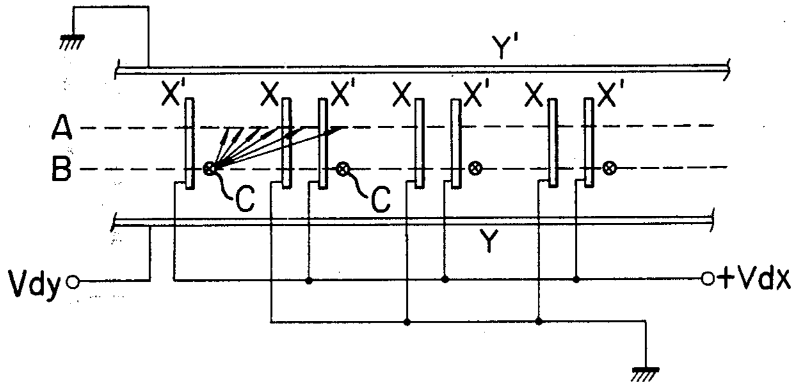
FIG. 13 shows a fifth embodiment of the present invention or a multiple-nozzle print head based on the underlying principle to be described with reference to FIGS. 11 and 12.

FIG. 13 shows in schematic view a multiple-nozzle print head wherein the print head units of the type described above are arranged in a horizontal array. The ink drops which issue from the nozzles C and are charged are placed along the ink dot printing line A, but the uncharged ink drops remain at the height B, traveling toward the gutter. The Y deflection electrodes Y and Y' are common to all print head units and are applied with the vertical deflection voltage $V_{dy}$ described above with reference to FIG. 12 so that the charged ink drops may be deflected vertically away from the gutter level B.

The fifth embodiment so far described is advantageous in that since the X and Y deflection electrodes are disposed in parallel with each other, the fabrication of the print heads may be much facilitated.

SIXTH EMBODIMENT, FIGS. 14 AND 15

Figure 14:
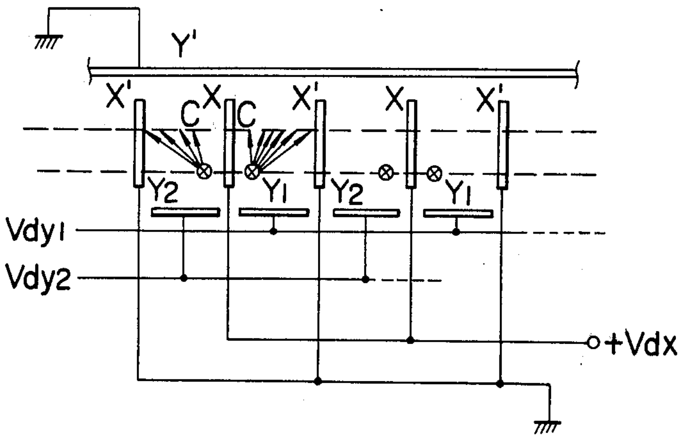
FIG. 14 is a schematic view of a sixth embodiment of the present invention.
Figure 15:
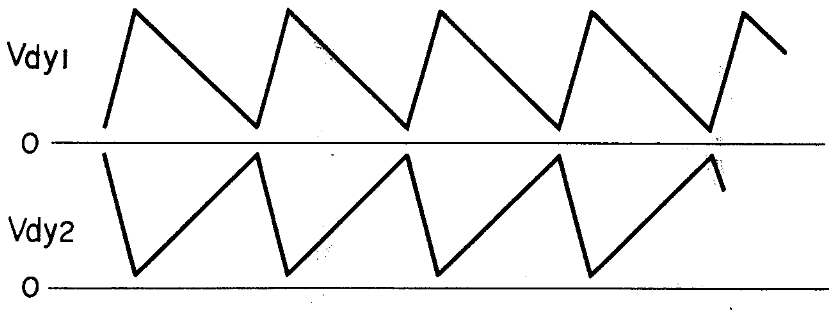
FIG. 15 shows the waveforms of the horizontal deflection voltages applied to the horizontal deflection electrodes shown in FIG. 14.

In FIG. 14 is shown a fifth embodiment of a multiple-nozzle print head which is similar in construction to the fifth embodiment shown in FIG. 13 except that one of the Y deflection electrodes Y', which is shown as being grounded is common to all print head units, but the other Y deflection electrodes $Y_1$ and $Y_2$ are provided for respective print head units and are alternately connected to the vertical deflection voltage sources $V_{dy1}$ and $V_{dy2}$ which, as shown in FIG. 15, are opposite in phase.

One of the X deflection electrodes X which is shown as being applied with the deflection voltage $+V_{dx}$ is shared in common by the adjacent print head units so that the charged ink drops are deflected in opposite directions by the adjacent print head units.

In summary, according to the present invention, there may be provided an ink-jet printer which may print not only high-quality images but also every ink dot along the ink dot printing line simultaneously. Furthermore the arrangements of deflection electrodes may be much simplified so that the multiple-nozzle arrangement may be much facilitated.

What is claimed is:

1. A variable-charge type ink-jet printer characterized by the provision of (a) a print head unit having a nozzle from which an ink jet issues;

(b) a charge electrode means for charging ink drops in response to the print signals;

(c) a pair of X-direction deflection electrodes; and (d) a pair of Y-direction deflection electrodes orthogonal to said pair of X-direction deflection electrodes, said Y-direction deflection electrodes being inclined with respect to each other so that the distance therebetween increases in the X-direction, so that ink drops which are more highly charged and which therefore undergo greater X-direction deflection, move through a weaker vertical field region of the deflection electrodes, so that the vertical deflection of said drops is made less than what it would otherwise be, whereby the charged ink drops may be deflected both in orthogonal X and Y directions to fly trajectories away from the trajectory of the uncharged ink drops, the deflections in the X-direction of the charged ink drops being varied depending upon the charge imparted to the respective ink drops, the relative inclination of the Y-direction deflection electrodes being such that the Y-direction deflections of said ink drops are the same regardless of the magnitude of the charges imparted to the respective ink drops.

2. An ink-jet printer as set forth in claim 1 further characterized in that a plurality of X-direction deflection electrodes and a plurality of Y-direction deflection electrodes are arranged in a horizontal array in such a way that each print head unit has its own pair of X-direction deflection electrodes or one of the X-direction deflection electrodes is shared in common by adjacent print head units and one of the Y-direction deflection electrodes may be shared in common by all the print head units.

3. A variable-charge type ink-jet printer characterized by the provision of:

a print head unit including a nozzle from which an ink jet issues;

a charge and selection electrode for charging ink drops in response to print signals;

a pair of X-direction or horizontal deflection electrodes;

means for applying a constant deflection voltage across said X-direction electrodes;

a pair of Y-direction or vertical deflection electrodes orthogonal to said X-direction or horizontal deflection electrodes;

means for applying to said Y-direction or vertical deflection electrodes a voltage having a negative slope sawtooth waveform, so that the more highly charged ink drops, which spend less time in the Y-direction deflection zone, are subjected to proportionately greater deflection forces than the lesser charged particles, which spend a greater amount of time in the Y-direction deflection zone, the slope of said sawtooth waveform being such that the Y-direction deflections of the charged ink drops between said Y-direction or vertical deflection electrodes are the same regardless of the magnitudes of the charges imparted to the respective ink drops.

4. An ink-jet printer as set forth in claim 3 further characterized in that a plurality of print head units are arranged in a horizontal array in such a way that said Y-direction or vertical deflection electrodes are shared in common by all the print head units while the pairs of X-direction or horizontal deflection electrodes are provided for respective print head units.

5. An ink jet printer as set forth in claim 3 further characterized in that a plurality of print head units are arranged in a horizontal array in such a way that one of the X-direction or horizontal deflection electrodes may be shared in common by the adjacent print head units and one of the Y-direction or vertical deflection electrodes is provided for each print head unit, and said one Y-direction or vertical deflection electrodes are alternately connected so as to be subjected to deflection voltages whose waveforms are opposite in phase.

6. A variable-charge type ink-jet printer characterized by the provision of:

(a) a nozzle from which an ink jet issues;

(b) a charge electrode means for charging ink drops in response to the print signals;

(c) a pair of X-direction deflection electrodes; and (d) a pair of Y-direction deflection electrodes orthogonal to said pair of X-direction deflection electrodes, whereby the charged ink drops may be deflected both in the horizontal and vertical directions to fly the trajectories away from the trajectory of the uncharged ink drop, the shape of said Y-direction deflection electrodes being such that the length of the trajectory between said Y-direction deflection electrodes of the charged ink drops may be varied depending upon the charge on said charged ink drop, whereby the deflections in the horizontal direction of the charged ink drops are varied depending upon the charge imparted to the respective ink drops, the deflections in the vertical direction of the charged ink drops being the same regardless of the charge imparted to the respective ink drops.

7. A variable-charge type ink-jet printer characterized by the provision of:

a plurality of print head units each having a nozzle from which an ink jet issues;

a charge electrode means for charging ink drops in response to the print signals;

a plurality of X-direction deflection electrodes and a plurality of Y-direction deflection electrodes arranged in a horizontal array in such a way that each print head unit has its own pair of X-direction deflection electrodes or one of the X-direction deflection electrodes is shared in common by the adjacent print head units, and one of the Y-direction deflection electrodes may be shared in common by all the print head units, said other Y-direction deflection electrodes being provided for respective print head units and being tilted with respect to said common Y-direction deflection electrode in such a way that the electric fields set up in the adjacent print head units are symmetrical both in magnitude and direction, and the length of the trajectory of each charged ink drop between said Y-direction deflection electrodes varies depending upon the charge on said charged ink drop, said Y-direction deflection electrodes being orthogonal to said pair of X-direction deflection electrodes, whereby the charged ink drops may be deflected both in the horizontal and vertical directions to fly trajectories away from the trajectory of the uncharged ink drops, the deflections in the horizontal direction of the charged ink drops being varied depending upon the charge imparted to the respective ink drops, but the deflections in the vertical direction of the charged ink drops being the same regardless of the charge imparted to the respective ink drops.

8. A variable-charge type ink-jet printer characterized by the provision of:

a plurality of print head units each having a nozzle from which an ink jet issues;

a charge electrode means for charging ink drops in response to the print signals;

a plurality of X-direction deflection electrodes and a plurality of Y-direction deflection electrodes arranged in a horizontal array in such a way that each print head unit has its own pair of X-direction deflection electrodes or one of the X-direction deflection electrodes is shared in common by the adjacent print head units, and one of the Y-direction deflection electrodes may be shared in common by all the print head units, said other Y-direction deflection electrodes being provided for respective print head units and being tilted with respect to said common Y-direction deflection electrode in such a way that the electric fields set up in the adjacent print head units are symmetrical both in magnitude and direction, said Y-direction deflection electrodes being orthogonal to said pair of X-direction deflection electrodes, whereby the charged ink drops may be deflected both in the horizontal and vertical directions to fly trajectories away from the trajectory of the uncharged ink drops, the deflections in the horizontal direction of the charged ink drops being varied depending upon the charge imparted to the respective ink drops, but the deflections in the vertical direction of the charged ink drops being the same regardless of the charge imparted to the respective ink drops.

9. A variable-charge type ink-jet printer comprising:

a print head unit including a nozzle from which an ink jet issues;

a charge and selection electrode for selectively charging ink drops with varying magnitudes of charge in response to print signals;

a pair of X-direction or horizontal deflection electrodes;

means for applying a constant deflection voltage across said X-direction electrodes;

a pair of Y-direction or vertical deflection electrodes orthogonal to said X-direction or horizontal deflection electrodes;

means for applying a deflection voltage across said Y-direction or vertical deflection electrodes; and means for controlling the trajectories of said ink drops between said Y-direction deflection electrodes so that the Y-direction deflections of the charged ink drops between said Y-direction or vertical deflection electrodes are the same regardless of the magnitudes of the charges imparted to the respective ink drops.

* * * * *